US010241858B2

(12) United States Patent
Kopetz

(10) Patent No.: US 10,241,858 B2
(45) Date of Patent: Mar. 26, 2019

(54) COMPUTER SYSTEM AND METHOD FOR SAFETY-CRITICAL APPLICATIONS

(71) Applicant: FTS COMPUTERTECHNIK GMBH, Vienna (AT)

(72) Inventor: Hermann Kopetz, Baden (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 66 days.

(21) Appl. No.: 15/508,924

(22) PCT Filed: Sep. 3, 2015

(86) PCT No.: PCT/AT2015/050212
§ 371 (c)(1),
(2) Date: Mar. 5, 2017

(87) PCT Pub. No.: WO2016/033629
PCT Pub. Date: Mar. 10, 2016

(65) Prior Publication Data
US 2017/0262330 A1    Sep. 14, 2017

(30) Foreign Application Priority Data

Sep. 5, 2014 (AT) .................................. 50613/2014

(51) Int. Cl.
*G06F 11/07*   (2006.01)
*G06F 11/16*   (2006.01)

(52) U.S. Cl.
CPC ...... *G06F 11/0796* (2013.01); *G06F 11/0739* (2013.01); *G06F 11/1641* (2013.01); *G06F 2201/805* (2013.01)

(58) Field of Classification Search
CPC .... G06F 11/07; G06F 11/076; G06F 11/0709; G06F 11/079

(Continued)

(56) References Cited

U.S. PATENT DOCUMENTS 5,694,542 A    12/1997  Kopetz
6,859,914 B2 *  2/2005  McConaghy ....... G06F 17/5063
                                                         700/121

(Continued)

FOREIGN PATENT DOCUMENTS

DE    102013202482 A1    8/2013
WO    2002/099643 A2    12/2002
WO    2013/100604 A1    7/2013

OTHER PUBLICATIONS

Office Action issued in Austrian application No. A 50613/2014, dated Feb. 19, 2015 (4 pages).

(Continued)

*Primary Examiner* — Kamini B Patel
(74) *Attorney, Agent, or Firm* — Eversheds Sutherland (US) LLP

(57) ABSTRACT

The invention relates to a computer system for carrying out safety-critical applications, said computer system comprising a plurality of node computers and a communications system. Sensor data are supplied in parallel to one or more node computers, the node computers calculating an optimized result, preferably using an optimization algorithm, in order to solve a given problem, and transmitting said optimized result, preferably for checking the safety, to a node computer which is designed as an SCFCU, said SCFCU being directly connected to the actuator controller, and the SCFCU furthermore calculating from the sensor data a simple result, which preferably meets all safety requirements, and an envelope of the simple result, and the SCFCU checking whether the resulting values, particularly those relevant to safety, of the optimized result lie within the envelope of the simple result, and, if this is the case, directly forwarding the optimized result to the actuator controller, (Continued)

and, if this is not the case, forwarding the simple result calculated by the SCFCU directly to the actuator control.

9 Claims, 1 Drawing Sheet

(58) Field of Classification Search
USPC .............................................. 714/24, 45, 55
See application file for complete search history.

(56) References Cited

U.S. PATENT DOCUMENTS

| | | | |
|---|---|---|---|
| 7,124,316 B2 | 10/2006 | Kopetz et al. | |
| 7,818,296 B2 | 10/2010 | Holt | |
| 8,396,934 B2 | 3/2013 | Kopetz et al. | |
| 9,063,837 B2* | 6/2015 | Bauer | G06F 1/14 |
| 9,130,661 B2 | 9/2015 | Poledna | |
| 9,407,696 B2 | 8/2016 | Poledna | |
| 9,503,521 B2 | 11/2016 | Poledna | |
| 9,575,859 B2 | 2/2017 | Poledna | |
| 2008/0183436 A1* | 7/2008 | Chen | G06F 17/5018 |
| | | | 703/1 |
| 2009/0323704 A1* | 12/2009 | Hall | H04L 12/42 |
| | | | 370/401 |
| 2010/0169251 A1* | 7/2010 | Cole | G05B 23/021 |
| | | | 706/13 |
| 2013/0182552 A1* | 7/2013 | Hall | H04L 41/0668 |
| | | | 370/216 |
| 2014/0244644 A1* | 8/2014 | Mashinchi | G06F 17/30595 |
| | | | 707/737 |
| 2015/0012779 A1* | 1/2015 | Poledna | G06F 11/0709 |
| | | | 714/31 |
| 2015/0039929 A1* | 2/2015 | Poledna | G06F 11/004 |
| | | | 714/2 |
| 2015/0063362 A1* | 3/2015 | Poledna | H04J 3/0673 |
| | | | 370/400 |
| 2016/0380858 A1* | 12/2016 | Poledna | H04L 41/0659 |
| | | | 709/224 |
| 2017/0228281 A1* | 8/2017 | Poledna | G06F 11/0796 |

OTHER PUBLICATIONS

International Search Report and Written Opinion for PCT/AT2015/050212, dated Mar. 22, 2016 (12 pages).
Kopetz, "Real-Time Systems", Design Principles for Distributed Embedded Applications, Springer, 2nd Edition, pp. 136-138.
Time Triggered Ethernet, Aerospace Standard AS6802, SAE International, 2011, pp. 1-108.
Envelope. (n.d.). Dictionary.com Unabridged. Retrieved Sep. 6, 2017 from Dictionary.com website http://www.dictionary.com/browse/envelope.

* cited by examiner

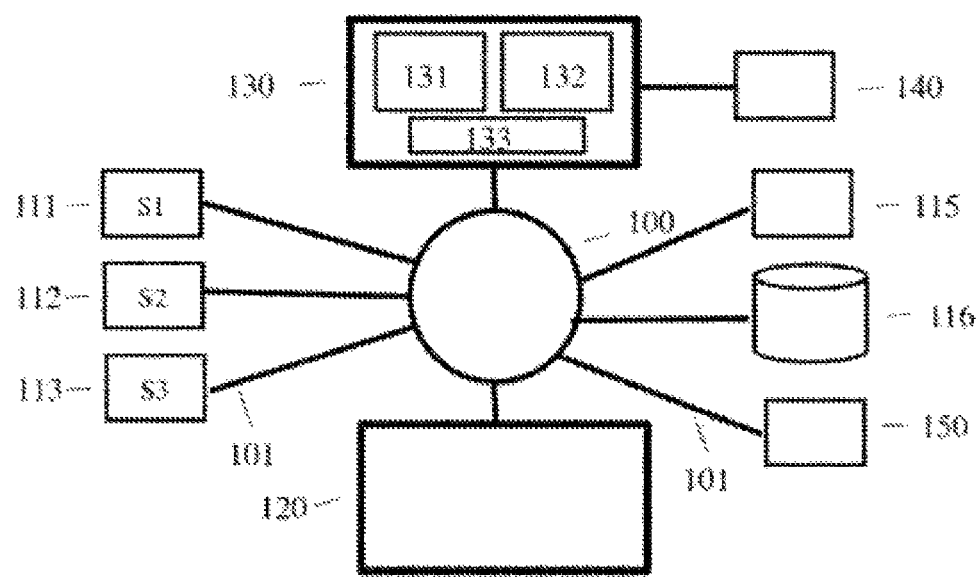

COMPUTER SYSTEM AND METHOD FOR SAFETY-CRITICAL APPLICATIONS

The invention relates to a computer system for carrying out safety-critical applications, the computer system comprising a plurality of node computers and a communication system.

The invention further relates to a method for carrying out safety-critical applications in a computer system, the computer system comprising a plurality of node computers and a communication system.

With the advance of computer technology into safety-critical systems, for example in the field of autonomous driving of motor vehicles, technical precautions must be taken which automatically bring the system into a safe state after a dangerous computer fault occurs. In an autonomous motor vehicle, a safe state is, for example, the stopped state of the vehicle.

According to the prior art, the control of a safety-critical system takes place using a distributed computer system. A distributed computer system is made up of a plurality of node computers, and a communication system via which the node computers exchange messages.

A node computer is a fault containment unit (FCU) when the direct consequences of the cause of a fault are limited exclusively to the node computer [2, p. 137]. The direct consequences of a fault in an FCU are the failure of an expected message or an erroneous message. An FCU which does not send a message in the event of a fault is referred to as a self-checking FCU (SCFCU for short) or a fail-silent FCU.

A fault in an FCU may be caused either by a physical defect in the hardware (hardware fault) or by an error in the design (software fault).

One option for implementing an SCFCU which does not send a message after the occurrence of a hardware fault lies in calculating the result in parallel, using two redundant, identical components, and subsequently comparing the results. If the results from the two components situated in parallel are different, no result (no message) is output to the surroundings. The technical level of effort for implementing such an SCFCU is more than twice that for implementing a nonself-checking FCU (NSCFCU for short).

One option for implementing an SCFCU that recognizes software faults lies in the parallel arrangement of two FCUs using different software which is based on the same task, and comparing the results (software diversity). If the results of the two FCUs arranged in parallel are different, no result (no message) is output to the surroundings. The technical level of effort for implementing such an SCFCU is more than twice that for implementing an NSCFCU.

If the software used in an FCU is simple enough that it can be formally checked and thoroughly tested, the assumption is justified that design errors do not occur during operation. In this case, it is sufficient when the SCFCU recognizes hardware faults.

In many technical applications, a distinction may be made between a simple result and an optimized result.

A simple result is present when a result is calculated, using an algorithm that can be thoroughly tested and preferably formally checked, that meets all safety-critical requirements and represents a usable solution of the assigned problem.

The envelope (the technical limits within which an electronic system may be safely operated [3]) of a simple result is understood to mean the quantity of all results that meet all safety-critical requirements and ensure a solution of the assigned problem.

An optimized result is present when a result is calculated that represents the best possible solution of the assigned problem under the given boundary conditions. In most cases, calculating an optimized result requires a significantly higher level of algorithmic and computational effort than calculating a simple result. In many cases, the complexity of an optimization algorithm makes it impossible to formally analyze the algorithm or thoroughly test it.

It is an object of the invention to provide a solution by means of which the occurrence of a dangerous fault in a safety-critical computer application may be recognized, and the consequences of the fault may be mitigated.

It is a further object of the invention to make it possible, in a simple manner, to check an optimized result for whether it corresponds to the given safety requirements in the particular application.

With a computer system mentioned at the outset, this object is achieved according to the invention in that sensor data are routed in parallel to one or more node computers, the node computers calculating an optimized result, preferably using an optimization algorithm, in order to solve a given problem, for example within the scope of the safety-critical application, and transmitting this optimized result, preferably for checking safety, to a node computer which is designed as an SCFCU, and the SCFCU being directly connected to the actuator controller, and the SCFCU furthermore calculating from the sensor data a simple result and an envelope of the simple result, and the SCFCU checking whether the result values, in particular those relevant to safety, of the optimized result lie within the envelope of the simple result, and if this is the case, directly relaying the optimized result to the actuator controller, and if this is not the case, relaying the simple result calculated by the SCFCU directly to the actuator controller.

A result may contain a plurality of associated result values; for example, a point in space that is to be controlled by a robotic arm at a point in time is a result that is composed of the result values for the three coordinates and the point in time.

Furthermore, with a method mentioned at the outset, this object is achieved according to the invention in that sensor data are processed in parallel by one or more node computers, the node computers, preferably using an optimization algorithm, calculating an optimized result for solving the assigned problem, for example within the scope of the safety-critical application, and this optimized result, preferably for checking safety, being transmitted to a node computer that is designed as an SCFCU, the SCFCU being directly connected to the actuator controller, and the SCFCU furthermore calculating from the sensor data a simple result, which preferably meets all safety requirements, and an envelope of the simple result, and the SCFCU checking whether the optimized result lies within the envelope of the simple result, and if this is the case, directly relaying the optimized result to the actuator controller, and if this is not the case, relaying the simple result calculated by the SCFCU directly to the actuator controller.

According to the invention, it is proposed, in a safety-relevant task, to carry out, preferably periodically, the calculation of the setpoint values for the actuator controller of at least two node computers working in parallel, whereby the particular node computer that outputs the setpoint values directly to the actuator controller must be designed as an SCFCU. The one or more other node computer(s) is/are not self-checking node computers, which may be designed with appropriate power (i.e., in each case more powerful than the SCFCU), and which use optimization algorithms to calculate an optimized result, which is transmitted to the SCFCU for checking. The SCFCU uses an easily analyzable algorithm to calculate a simple result and an envelope of the simple result. The SCFCU checks whether the optimized result lies within the envelope of the simple result. If this is the case, the optimized result, which has been calculated by the powerful node computers, is relayed to the actuator controller. If this is not the case, the simple result, which has been calculated by the SCFCU, is relayed to the actuator controller.

The actuator controller monitors the arrival of the periodic message from the SCFCU to the actuator controller by means of a timeout. If it is recognized via the timeout that the actuator controller has not received a message from the SCFCU, the actuator controller autonomously searches for a safe state. The safe state depends on the particular specific safety-critical application.

Advantageous embodiments of the invention, which may be implemented alone or in any given combination, are described below:

It is advantageous when the communication system is a time-triggered communication system.

It is advantageous when the communication between the node computers is based on the TTEthernet protocol.

It is advantageous when the SCFCU is made up of two components and a comparator, and wherein the two components calculate two results in parallel based on the input data or sensor data, and the comparator subsequently checks whether the two results are identical, and if this is not the case, the SCFCU does not produce output data.

Furthermore, it is advantageous for the SCFCU to periodically send a message to the actuator controller.

It may be advantageous for the SCFCU to periodically send a message to the actuator controller at points in time that are fixed a priori.

It may be practical for the actuator controller to autonomously place the actuators in a safe state when the periodic message from the SCFCU is absent at the actuator controller.

It is advantageous for the SCFCU to send a message to a node computer, which is designed as a monitor node, when the optimized result lies outside the envelope of the simple result.

One specific implementation of this device and of this method is presented in the following description.

The invention is explained in greater detail below with reference to the drawing. In the single drawing, FIG. 1 shows by way of example the structure of a computer system for implementing a safety-critical task in an autonomous vehicle.

The following specific example concerns the calculation of the optimal safe speed of an autonomous vehicle along a given route that is specified in a navigation database. In this example, minimum energy consumption along the route is specified as an optimization objective according to the intent of the driver. In an electric vehicle, minimum energy consumption is of particular importance, since it determines the cruising range of the vehicle with a battery charge.

The minimum energy consumption is calculated using a comprehensive optimization model, which for each route segment specifies an optimal speed, taking into account the energy consumption of the motor, the free-running characteristics of the vehicle, the course and slope of the roadway, the present and future curve radii of the roadway, the given surface conditions of the roadway (for example, dry, wet, snow-covered), the legally prescribed maximum speed, and the specific traffic volume. Due to the complexity of such a model, formal verification of the model cannot be performed using the methods presently available.

FIG. 1 shows the structure of a distributed computer system that is designed for safety-critical tasks, with connected sensors and actuators. A sensor S1 111, in the present example a GPS sensor, detects the position of the vehicle. A sensor S2 112, in the present example a camera, observes the traffic signs. A distance sensor S3 113, for example a radar sensor, measures the distance from the nearest vehicle or an obstacle on the roadway. A node computer 115 detects the driver's intent. A node computer 140, in the present example an actuator controller, accepts a predefined setpoint value from an SCFCU 130. A navigation database 116 contains the navigation data, which describe the course of the route. A node computer 150 is a monitor component which observes the operation of the system and stores error messages.

The sensors 111, 112, and 113, the input unit 115 for the driver's intent, the navigation database 116, an additional, preferably more powerful, node computer 120, and the SCFCU 130 exchange messages via a central message distributor unit 100. It is advantageous for the message distribution to be achieved via a time-triggered communication protocol, for example the TTEthernet protocol [4]. A time-triggered protocol recognizes the occurrence of faults within the time range.

The sensors 111, 112, 113, the node computer 120, the SCFCU 130, the node computers 140, 150, and the node computer 115 involve node computers.

Situated in the bottom portion of FIG. 1 is the preferably powerful node computer 120, which calculates the optimal speed (optimized result) for each route segment, using a comprehensive optimization model. The calculation preferably takes place periodically, in the specific example the duration of a period being 100 msec. At a speed of 30 m/sec, i.e., 108 km/h, a route segment of 3 m is covered in one period. Based on the input data of the sensors and the position on the planned route, the node computer 120 calculates an optimal speed for the next one hundred route segments, for example, and sends these speeds to the SCFCU 130 for checking.

Since latent design errors may be present in the complex optimization model of the node computer 120, and/or since the node computer 120 has no self-checking hardware, and unrecognized hardware faults, primarily transient hardware faults, may occur in this nonself-checking computer hardware, a result that is calculated by the node computer 120 may be erroneous.

In the schematic illustration shown in the top portion of FIG. 1, the computer system therefore has a self-checking FCU, the so-called SCFCU 130 mentioned above. The SCFCU 130 contains two components 131 and 132, which, based on the input data of the sensors and the position on the planned route, calculate in parallel a simple result (i.e., a safe speed in the specific example) and an envelope of this simple result on the present route segment, using an algorithm that is preferably available from formal analysis. In the selected example, the boundaries of the envelope result from the legally prescribed maximum speed detected by the sensor 112, the instantaneous curve radius of the route segment taken from the navigation database, the specific state of the roadway, and the distance from vehicles traveling ahead, measured by the distance sensor 113.

In the model of the SCFCU 130, the simple result (i.e., the safe speed) is calculated only for the present route segment (not for the one hundred future route segments, as in the complex optimization model 120). To keep the model simple, the optimization of the energy consumption along the route to the destination is not taken into account in an algorithm that is processed on the SCFCU 130. For example, a value of 80% of the maximum speed that is calculated under the given conditions is applied as the safe speed. The envelope of the safe speed includes all speeds that are less than the calculated maximum safe speed.

If the speed value calculated by the node computer 120 for the present route segment lies within the envelope calculated by the SCFCU 130, this speed value is transmitted from the SCFCU 130 to the actuator controller 140 (the motor controller). If this is not the case, the simple (i.e., safe) speed value determined by the SCFCU 130 is transmitted to the motor controller 140.

In the fault-free case, the optimal speed calculated by the node computer 120 lies within the envelope of the safe speed; the optimal speed for minimum energy consumption may be slower than the safe speed value that is calculated by the node computer 120.

If the SCFCU 130 determines that the speed value calculated by the node computer 120 is outside the envelope calculated by the SCFCU 130, the SCFCU 130 sends an error message to the monitor component 150.

If the actuator controller 140 determines after a fixed timeout, which is derived, for example, from the period of the calculation, that no message has been received by the SCFCU, the actuator controller autonomously places the system in a safe state. In the specific example, the actuator controller brings the vehicle to a stop in this case.

If the points in time of the beginning of the period and the end of the period are determined by a global time, the actuator controller 140 may autonomously place the system in a safe state immediately after the absence of a message from the SCFCU 130.

The SCFCU 130 is directly connected to the actuator controller 140, while the node computer 120 is connected to the actuator controller via the SCFCU 130, as the result of which the node computer 120 is not able to transmit its values directly to the actuator controller, and can do so only after prior checking by the SCFCU.

Another specific example concerns the checking of the boundaries of the secured space in which a mobile robot is allowed to move. If the algorithm, which calculates the commands for carrying out a given task (for example, charging a vehicle), on account of a fault (in the hardware or in the software) specifies a setpoint value to the robot controller that is outside the delimited space, the corresponding SCFCU will not relay this setpoint value to the robot controller, and will stop the robot.

The present invention concerns the field of distributed safety-relevant computer systems for controlling technical systems. It is proposed, in a safety-critical application, for powerful, nonself-checking computers to calculate an optimal result, followed by checking by a different, self-checking computer whether the optimal result corresponds to the given safety requirements.

LITERATURE CITATIONS

[1] U.S. Pat. No. 7,818,296. Holt, J. M. Computer Architecture and Method of Operation for Multi-Computer Distributed Processing with Synchronization.
[2] Kopetz, H. Real-time Systems—Design Principles for Distributed Embedded Applications. Springer Verlag, 2011.
[3] Kariger, B, Fierro, D. Dictionary.com. URL: http://dictionary.reference.com
[4] SAE Standard AS6802 for TT Ethernet. URL: http://standards.sae.org/as6802

The invention claimed is:

1. A computer system for carrying out safety-critical applications, the computer system comprising:
a plurality of node computers, and
a communication system,
wherein sensor data are routed in parallel to one or more not self-checking node computers which are configured to calculate an optimized result using an optimization algorithm in order to solve a given problem, and transmitting this optimized result for checking safety to a node computer which is designed as a self-checking fault containment unit ("SCFCU"), and the SCFCU being directly connected to an actuator controller, and
wherein the SCFCU is configured (i) to calculate from the sensor data a simple result, which meets all safety requirements, and an envelope of the simple result, and (ii) to check whether result values relevant to safety of the optimized result lie within the envelope of the simple result, and if this is the case, to directly relay the optimized result to the actuator controller, and if this is not the case, to relay the simple result calculated by the SCFCU directly to the actuator controller.

2. The computer system of claim 1, wherein the communication system is a time-triggered communication system.

3. The computer system of claim 1, wherein the communication between the node computers is based on the TTEthernet protocol.

4. The computer system of claim 1, wherein the SCFCU is made up of two components and a comparator, and wherein the two components are configured to calculate two results in parallel based on the input data or sensor data, and the comparator is configured to subsequently check whether the two results are identical, and if this is not the case, the SCFCU does not produce output data.

5. A method for carrying out safety-critical applications in a computer system, the computer system comprising a plurality of node computers and a communication system, wherein sensor data are processed in parallel by one or more not self-checking node computers, the method comprising:
using the non self-checking node computers, using an optimization algorithm, to calculate an optimized result for solving an assigned problem,
transmitting this optimized result, for checking safety, to a node computer that is designed as a self-checking fault containment unit ("SCFCU"), the SCFCU being directly connected to-an actuator controller,
using the SCFCU to calculate from the sensor data a simple result, which meets all safety requirements, and an envelope of the simple result, using an algorithm that is available from formal analysis, and
using the SCFCU to check whether the optimized result lies within the envelope of the simple result, and if this is the case, directly relaying the optimized result to the actuator controller, and if this is not the case, relaying the simple result calculated by the SCFCU directly to the actuator controller.

6. The method of claim 5, wherein the SCFCU periodically sends a message to the actuator controller.

7. The method of claim 5, wherein the SCFCU periodically sends a message to the actuator controller at points in time that are fixed a priori.

8. The method of claim 5, wherein the actuator controller autonomously places actuators in a safe state when the periodic message from the SCFCU is absent at the actuator controller.

9. The method of claim 5, wherein the SCFCU sends a message to a node computer, which is designed as a monitor node, when the optimized result lies outside the envelope of the simple result.

\* \* \* \* \*